3,043,033
UTILITY SCOOP
Hubert Odell Ingram, Moriarty, N. Mex. (309 Schultz NW., Albuquerque, N. Mex.), and Ervan Clayton Cavasos, Moriarty, N. Mex.
Filed July 13, 1959, Ser. No. 826,773
13 Claims. (Cl. 37—130)

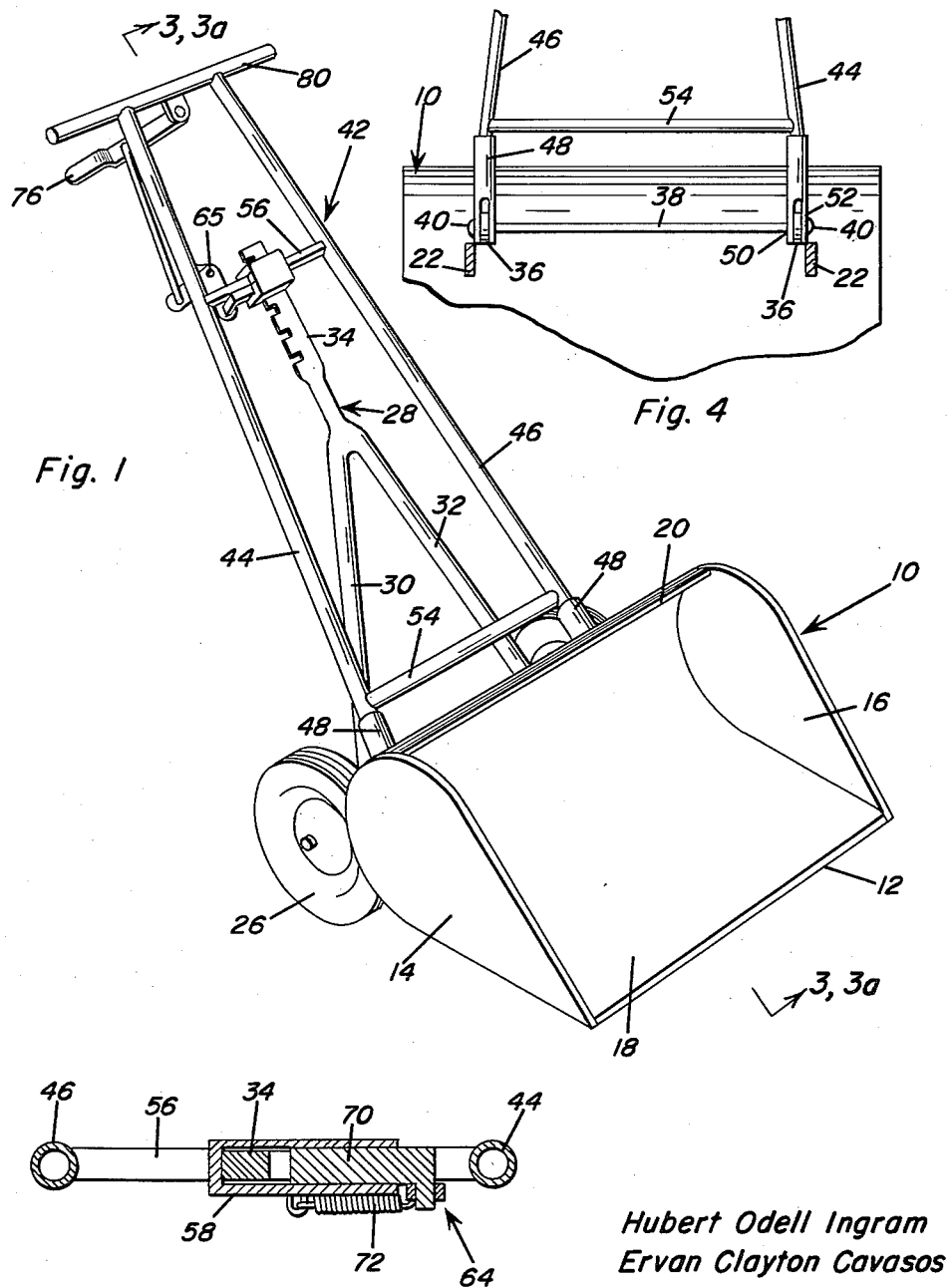

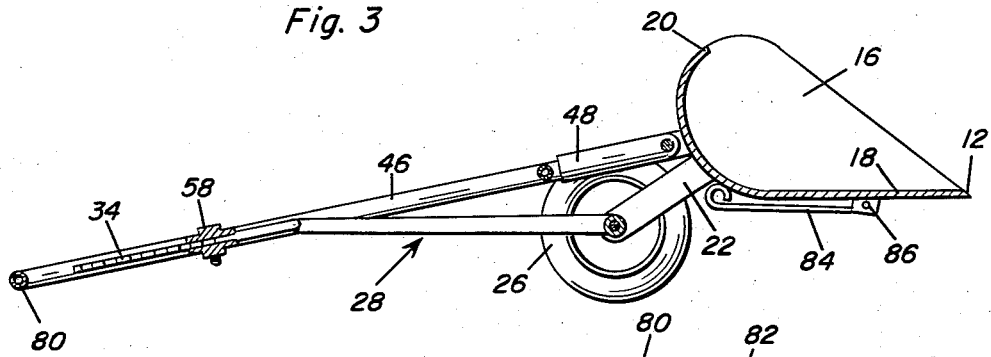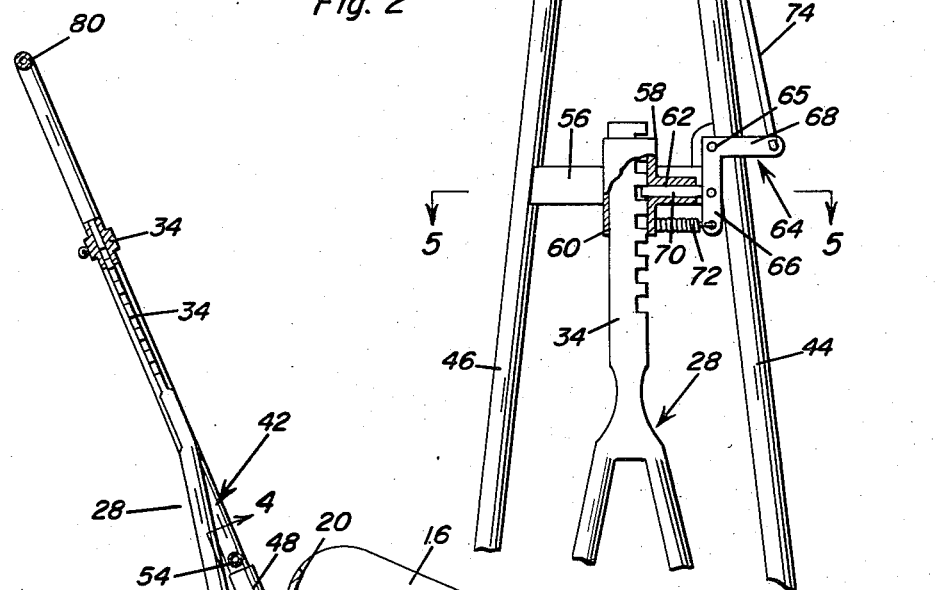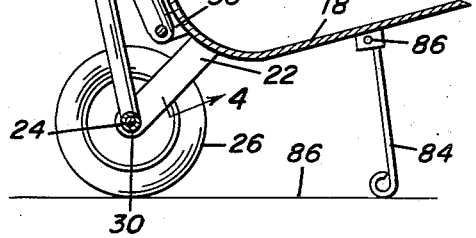

This invention relates generally to a wheeled scoop and more particularly to a utility scoop which is simple in construction and which may be utilized in any of a plurality of positions for serving a variety of functions.

Wheeled scoops, carts, wheelbarrows and similar devices are variously used for carting dirt, goods, snow, etc. Though wheelbarrows must be loaded by hand as by a shovel, wheeled scoops may be utilized by simply motivating the scoop into a pile of dirt or snow and then lifting the scoop to roll it away on its ground wheels.

It is the principal object of this invention to provide a novel utility scoop construction which is particularly characterized by its simplicity in operation and reliability.

It is a further object of this invention to provide a novel utility scoop construction which due to its simplicity is relatively inexpensive to manufacture but which may be efficiently utilized for a variety of functions.

In accordance with the above stated objects, below is specifically described the novel construction and utilization of the utility scoop comprising this invention. Initially, a scoop is provided which has a pair of arms extending therefrom which rotatably carry an axle therebetween. The axle terminally supports ground wheels. An adjustable arm is pivotally carried by the axle and has integrally formed on the end thereof a toothed rack. A fixed arm is pivotally secured to the scoop and defines a pivot axis which is spaced from the axle. The fixed arm has a sleeve thereon through which extends the toothed rack. A detent is carried by a bell crank pivotally secured to the fixed arm with the detent being engageable with the rack. A spring is fixed to one leg of the bell crank for urging the detent into engagement with the rack. A tie rod is secured to a second leg of the bell crank and to a lever carried by said fixed arm. Upon pivotal movement of the lever, the tie rod may pivot the bell crank to disengage the detent from the rack to allow individual pivotal movement of the adjustable and fixed arms relative to the scoop. In this manner, the scoop may be utilized to scoop snow or dirt from piles and also may be conveniently utilized to transport and dump the load.

Other objects and advantages which will become apparent reside in the details of construction and operation as more fully hereinafter described and claimed, reference being had to the accompanying drawings forming a part hereof, wherein like numerals refer to like parts throughout, and in which:

FIGURE 1 is a perspective view of the utility scoop comprising this invention;

FIGURE 2 is an enlarged fragmentary rear elevational view partially broken away of the locking means between the adjustable and fixed arms;

FIGURE 3 and 3a are sectional views taken substantially along the plane 3—3 and 3a—3a of FIGURE 1 with FIGURE 3 illustrating an extreme lower position of the utility scoop and FIGURE 3a illustrating a second extreme elevated position of the utility scoop;

FIGURE 4 is an enlarged fragmentary sectional view taken substantially along the plane 4—4 of FIGURE 3a; and FIGURE 5 is a sectional view taken substantially along the plane 5—5 of FIGURE 2.

With continuing reference to the drawings the numeral 10 generally represents the material handling scoop forming a portion of the wheeled utility scoop comprising this invention. The scoop 10 has a beveled forward edge 12 and a pair of sides 14 and 16 extending perpendicular to the bottom 18. The bottom 18 is curved upwardly at the rear 20 thereof.

A pair of spaced arms 22 are secured to the scoop 10 as by welding. An axle 24 is rotatably supported between the spaced arms 22. Ground wheels 26 are terminally carried by the axle 24.

A releasable scoop adjusting assembly 28 has a collar 31 formed on the end thereof which receives the axle 24. The releasable arm assembly 28 is pivotable on the axle 24 and is forked including depending portions 30 and 32. Integrally formed at the upper end of the arm assembly 28 is a toothed rack portion 34.

A second pair of spaced arms 36 is secured to the scoop 10 as by welding above the spaced arms 22. The arms 36 carry a shaft 38 therebetween with the ends of the shaft 38 being enlarged as is illustrated at 40. A handle arm assembly 42 has a pair of elongated members 44 and 46 which converge as they move away from the scoop 10. Adjacent the scoop 10 they are received within sleeves 48 which are bifurcated as at 50 and 52. The arms 36 are received between the bifurcations 50 and 52 with the shaft 38 extending therethrough. Accordingly, it will be apparent that the fixed arm 42 may pivote about the shaft 38. A first brace 54 connects the member 44 and 46 while a second brace 56 extends parallel to the brace 54 to secure the members 44 and 46 properly remote from the scoop 10.

Secured to the brace 56 is a tubular guide or sleeve 58 which has a pair of passages extending perpendicular to each other, said guide being generally T-shaped. The first passage through the sleeve 58 receives the rack 34 of arm assembly 28 for slidable movement therethrough. The first passage is designated as 60 while the second passage extending perpendicular therethrough is designated as 62. A bell crank 64 is pivoted to a projection fixed to the member 44 at 65. The bell crank 64 includes a first leg 66 and a second leg 68. The first leg 66 has a detent 70 which is pivoted thereto and extends through the passage 62 forming a detent guide and is engageable with the teeth of the toothed rack 34 in the passage 60. A spring 72 is secured between the sleeve 58 and the first leg 66 of the bell crank 64 in a manner to urge the detent 70 into engagement with the teeth of the tooth rack 34. Accordingly, it will be seen that under normal conditions, both the arm assembly 28 and handle arm 42 will be locked or latched from pivotal movement relative to the scoop 10. In order to release the locking means, a tie rod 74 connects the leg 68 above crank 64 to a lever 76 pivotally connected at 78 to handle 80 bridging members 44 and 46 parallel to the braces 54 and 56. A guide 82 is secured to the member 44 to assure the proper movement of the lever 76. It will be apparent therefore, that an upward or counterclockwise movement of the lever 76, as illustrated in FIGURE 2, pulls the tie rod 74 upwardly to pivot the bell crank 64 about point 65 to withdraw the detent 70 from engagement with the teeth of the toothed rack 34 against the spring urging of spring 72.

With the detent 70 not engaged with the teeth of toothed rack 34, pivotal displacement of the handle assembly 42 by the operator will cause slidable displacement of the assembly 28 with respect to the assembly 42 to automatically change the angular relationship between the scoop portion 10 and the handle assembly as illustrated in FIGURE 3 and FIGURE 3a. In FIGURE 3, the utility scoop is in a lowered position well adapted to scoop material, as dirt or snow, from a pile. As illustrated in FIGURE 3a, the utility scoop is in an elevated position and may be supported on a leg 84 pivotally secured to the scoop 10 at 86. In intermediate positions, between the extreme positions illustrated in FIGURES 3 and 3a, the utility scoop is well adapted for movitating the scoop along the ground 86 on wheels 26. With the leg 84 in the position illustrated in FIGURE 3, the device may be moved along the ground on the wheels 26 without impedance therefrom. Upon reaching the destination, a counterclockwise force on the lever 76 will release the detent 70 from engagement with the teeth of rack 34 to allow the scoop 10 to move clockwise about the axle 24, as illustrated in FIGURE 3a. Of course, it will be realized that when the scoop 10 pivots about axle 24 clockwise, the rack 34 will be forced upwardly through the sleeve 58.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A utility scoop comprising, wheel means, material handling means supported by the wheel means above and forwardly of the wheel means and pivotally displaceable from an elevated position to a lower position with respect to the wheel means, handle means pivotally mounted for vertical swinging adjustment on the material handling means above the wheel means and operative to transmit propelling force to the material handling means, and releasable means operatively interconnecting the wheel means and handle means for holding the material handling means in adjusted position with respect to the wheel means and handle means and operative upon release to effect pivotal displacement of the material handling means with respect to the wheel means in response to pivotal displacement of the handle means.

2. The combination of claim 1 wherein said material handling means includes a scoop body having a rear wall and a forward scoop edge adapted to be disposed adjacent to the ground when in said lower position.

3. The combination of claim 2, wherein said releasable means includes an arm pivotally connected to said wheel means and slidably mounted in the handle means and releasable lock means operatively connecting the handle means and arm when engaged to prevent slidable displacement therebetween from an adjusted position.

4. The combination of claim 3, wherein said handle means is pivotally connected to the rear wall of the material handling means extending rearwardly therefrom for transmitting propelling force to the scoop when the lock means is engaged and pivotally displaceable with respect thereto when the lock means is disengaged.

5. The combination of claim 4 including foldable leg means mounted on the material handling means for extension therebelow for self support of the scoop when the handle means is in the elevated position.

6. The combination of claim 1, including foldable leg means mounted on the material handling means for extension therebelow for self support of the scoop when the handling means is in the elevated position.

7. The combination of claim 1, wherein said handle means is pivotally connected to the material handling means rearwardly thereof for transmitting propelling force thereto.

8. The combination of claim 1, wherein said releasable means includes an arm pivotally connected to said wheel means and slidably mounted in the handle means and releasable lock means operatively connecting the handle means and arm when engaged to prevent slidable displacement therebetween from an adjusted position.

9. The combination of claim 8, wherein said arm includes a slidable portion disposed parallel to said handle means and slidably adjustable with respect thereto and a connecting portion disposed at a fixed angle to the handle means.

10. A utility scoop comprising a pair of supporting wheels, a scoop member pivotally mounted for vertical swinging adjustment on said wheels in forwardly spaced relation thereto, a propulsion handle for the scoop member pivotally mounted for vertical swinging adjustment thereon, and means adjustably anchoring the handle to the wheels for securing said handle in pivotally adjusted position on the scoop member whereby said handle and said scoop member are swingable in unison about the axis of the wheels.

11. A utility scoop comprising supporting wheels, a scoop member pivotally mounted for vertical swinging adjustment on said wheels in forwardly spaced relation thereto, a propulsion handle mounted for sliding and swinging adjustment on the wheels and hingedly connected to the scoop member for pivotal adjustment thereon in a vertical plane, and means for releasably locking the handle in slidably adjusted position on the wheels and in pivotally adjusted position on the scoop member for swinging movement in unison therewith about the axis of the wheels, said means comprising an arm assembly mounted for swinging movement on the wheels and including a rack bar slidably connected to the handle for supporting same on the wheels, and a latch on the handle engageable with the rack bar for retaining said handle against sliding movement thereon.

12. A utility cart in accordance with claim 11, wherein said latch includes a generally T-shaped tubular guide mounted on the handle and slidably receiving the rack bar, a detent slidable in the guide and engageable with the rack bar for locking same, a bell crank lever pivotally mounted on the handle and connected to the detent, an actuating spring connected to one end of the bell crank lever for engaging the detent with the rack bar, and a lever pivotally mounted on the handle and operatively connected to the other end of the bell crank lever for retracting the detent and operable by the fingers of a hand which grips said handle.

13. A utility cart comprising an axle, supporting wheels journaled on the end portions of said axle, a pair of arms mounted for swinging movement on the axle, a scoop member fixed on said arms, a generally U-shaped propulsion handle for the scoop member pivotally connected to the scoop member for vertical swinging adjustment thereon, a tubular guide mounted on the handle, a generally V-shaped arm mounted for swinging movement on the axle, a rack bar on the apex of the last-named arm slidably engaged in the guide for slidably connecting the handle to the last-named arm, and a latch on the handle engageable with the rack bar for locking the handle in adjusted position.

References Cited in the file of this patent

UNITED STATES PATENTS

| 478,710 | Parham | July 12, 1892 |
| 481,843 | Bowler | Aug. 30, 1892 |
| 1,298,126 | Vessey | Mar. 25, 1919 |
| 2,103,866 | Norris | Dec. 28, 1937 |
| 2,693,389 | Maxwell | Nov. 2, 1954 |
| 2,895,238 | Long | July 21, 1959 |

FOREIGN PATENTS

| 131,634 | Great Britain | Aug. 28, 1919 |